(12) United States Patent
Takacs et al.

(10) Patent No.: US 11,097,425 B2
(45) Date of Patent: Aug. 24, 2021

(54) AUTOMATED SWITCH ACTIVATION SYSTEM

(71) Applicant: LOCKHEED MARTIN CORPORATION, Bethesda, MD (US)

(72) Inventors: Robert S. Takacs, Oxford, CT (US); Michael A. Connor, New Haven, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 170 days.

(21) Appl. No.: 16/571,924

(22) Filed: Sep. 16, 2019

(65) Prior Publication Data

US 2021/0078179 A1  Mar. 18, 2021

(51) Int. Cl.
| | | |
|---|---|---|
| *B25J 9/16* | (2006.01) | |
| *G05B 15/02* | (2006.01) | |
| *H01H 3/02* | (2006.01) | |
| *H01H 3/54* | (2006.01) | |

(52) U.S. Cl.
CPC ............ *B25J 9/1697* (2013.01); *G05B 15/02* (2013.01); *H01H 3/02* (2013.01); *H01H 3/54* (2013.01)

(58) Field of Classification Search
CPC ......... B25J 9/1697; G05B 15/02; H01H 3/02; H01H 3/54

USPC .......................................................... 700/259
See application file for complete search history.

(56) References Cited

U.S. PATENT DOCUMENTS

| | | | |
|---|---|---|---|
| 8,026,827 B1 | 9/2011 | Boyd et al. | |
| 9,471,176 B2 | 10/2016 | Nikolic et al. | |
| 10,180,722 B2 | 1/2019 | Lu | |
| 10,850,397 B2* | 12/2020 | Bosworth | B64C 13/18 |
| 2007/0236366 A1* | 10/2007 | Gur | G06K 9/00832 |
| | | | 340/945 |
| 2017/0277185 A1 | 9/2017 | Duda et al. | |
| 2019/0321981 A1* | 10/2019 | Bosworth | B25J 19/021 |

* cited by examiner

*Primary Examiner* — Mohammad Ali
*Assistant Examiner* — Joshua T Sanders
(74) *Attorney, Agent, or Firm* — Foley & Lardner LLP

(57) ABSTRACT

According to an aspect, a releasable actuation system includes a support member, a carriage movable relative to the support member, a releasable mount configured to couple the support member to a frame, the support member being rotatable relative to the releasable mount by a rotatable joint, an image capturing sensor connected to the carriage, an actuator connected to the carriage and operable to adjust a position of a switch, a memory having computer readable instructions, and one or more processors for executing the computer readable instructions, the computer readable instructions controlling the one or more processors to perform operations comprising directing the actuator to adjust the position of the switch.

17 Claims, 6 Drawing Sheets

AUTOMATED SWITCH ACTIVATION SYSTEM

BACKGROUND

Exemplary embodiments relate to retrofitting switch panels of aircraft or automobile, and more particularly, to an automated and releasable switch activation system.

Legacy aircraft and automobile console panels employ push button, rotary, and toggle switches that are user-activated and provide feedback through lighted annunciation and position. Modern fleets of automobiles and aircraft are being converted to include autonomous features that often require highly invasive systems, new switches, wiring, and data converters. The cost of replacing legacy console panels can make conversion/retrofitting costly.

BRIEF DESCRIPTION

According to one embodiment, a releasable actuation system includes a support member, a carriage movable relative to the support member, a releasable mount configured to couple the support member to a frame, the support member being rotatable relative to the releasable mount by a rotatable joint, an image capturing sensor connected to the carriage, an actuator connected to the carriage and operable to adjust a position of a switch, a memory having computer readable instructions, and one or more processors for executing the computer readable instructions, the computer readable instructions controlling the one or more processors to perform operations comprising directing the actuator to adjust the position of the switch.

In addition to one or more of the features described above or below, or as an alternative, further embodiments include where a first motor is coupled to the carriage and the support member.

In addition to one or more of the features described above or below, or as an alternative, further embodiments include where the computer readable instructions controlling the one or more processors to perform operations further comprising receiving an image of a switch panel from the image capturing sensor, mapping a position of each switch of the panel to a coordinate system, and directing the actuator to adjust the position of the switch based in part on information received from an external sensor.

In addition to one or more of the features described above or below, or as an alternative, further embodiments include where the computer readable instructions control the one or more processors to perform operations further comprising disengaging from the actuator and the motor in response to detecting that the support member is rotating away from the switch panel.

In addition to one or more of the features described above or below, or as an alternative, further embodiments include where the computer readable instructions control the one or more processors to perform operations further comprising engaging the actuator and the motor in response to detecting that the support member is rotating towards the switch panel.

In addition to one or more of the features described above or below, or as an alternative, further embodiments include where the computer readable instructions control the one or more processors to perform operations further comprising disengaging from the actuator and the motor in response to detecting that the releasable mount is removed from the frame.

In addition to one or more of the features described above or below, or as an alternative, further embodiments include where the computer readable instructions control the one or more processors to perform operations further comprising engaging the actuator and the motor in response to detecting that the releasable mount is coupled to the frame.

In addition to one or more of the features described above or below, or as an alternative, further embodiments include where the computer readable instructions control the one or more processors to perform operations further comprising performing a pre-loaded sequence of switch adjustments.

In addition to one or more of the features described above or below, or as an alternative, further embodiments include where the releasable mount includes a pressure sensor.

In addition to one or more of the features described above or below, or as an alternative, further embodiments include where the carriage includes a motion-detecting sensor.

In addition to one or more of the features described above or below, or as an alternative, further embodiments include where the support member has a straight orientation.

In addition to one or more of the features described above or below, or as an alternative, further embodiments include where the support member has a curved orientation.

In addition to one or more of the features described above or below, or as an alternative, further embodiments include where the external sensor is arranged on a frame of an aircraft or an automobile.

According to another embodiment, a computer-implemented method for releasable actuation comprises receiving, by a processor, an image of a switch panel and a functionality of each switch on the switch panel, mapping a position, functionality, and type of switch to a coordinate system of a releasable apparatus, and directing actuation of a switch using the coordinate system and based on information received from an external sensor.

In addition to one or more of the features described above or below, or as an alternative, further embodiments of the method include performing a pre-loaded sequence of switch adjustments.

In addition to one or more of the features described above or below, or as an alternative, further embodiments of the method include disengaging from an actuator and a motor of the releasable apparatus in response to detecting that a releasable mount of the releasable apparatus is removed from a frame.

In addition to one or more of the features described above or below, or as an alternative, further embodiments of the method include engaging an actuator and a motor of the releasable apparatus in response to detecting that a releasable mount of the releasable apparatus is coupled to a frame.

In addition to one or more of the features described above or below, or as an alternative, further embodiments of the method include disengaging from an actuator and a motor of the releasable apparatus in response to detecting that a support member of the releasable apparatus is rotating away from the switch panel.

In addition to one or more of the features described above or below, or as an alternative, further embodiments of the method include engaging an actuator and a motor of the releasable apparatus in response to detecting that a support member of the releasable apparatus is rotating towards the switch panel.

In addition to one or more of the features described above or below, or as an alternative, further embodiments of the method include where the switch panel is arranged on a frame of an aircraft or an automobile.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses is presented herein by way of exemplification and not limitation with reference to the Figures.

Using a frame mounted about a switch panel, with an X- and Y-axis motor, and third, Z-axis, an actuator can be positioned to push a button, toggle a switch, or rotate and knob. The actuator could have a camera to read a switch position or annunciation and can sense a switch position. The system would be controlled through a pre-programmed processor. A back-up feature is included to move/swing the apparatus out of the way to allow a pilot access to the switches in case of failure.

Figure 1:
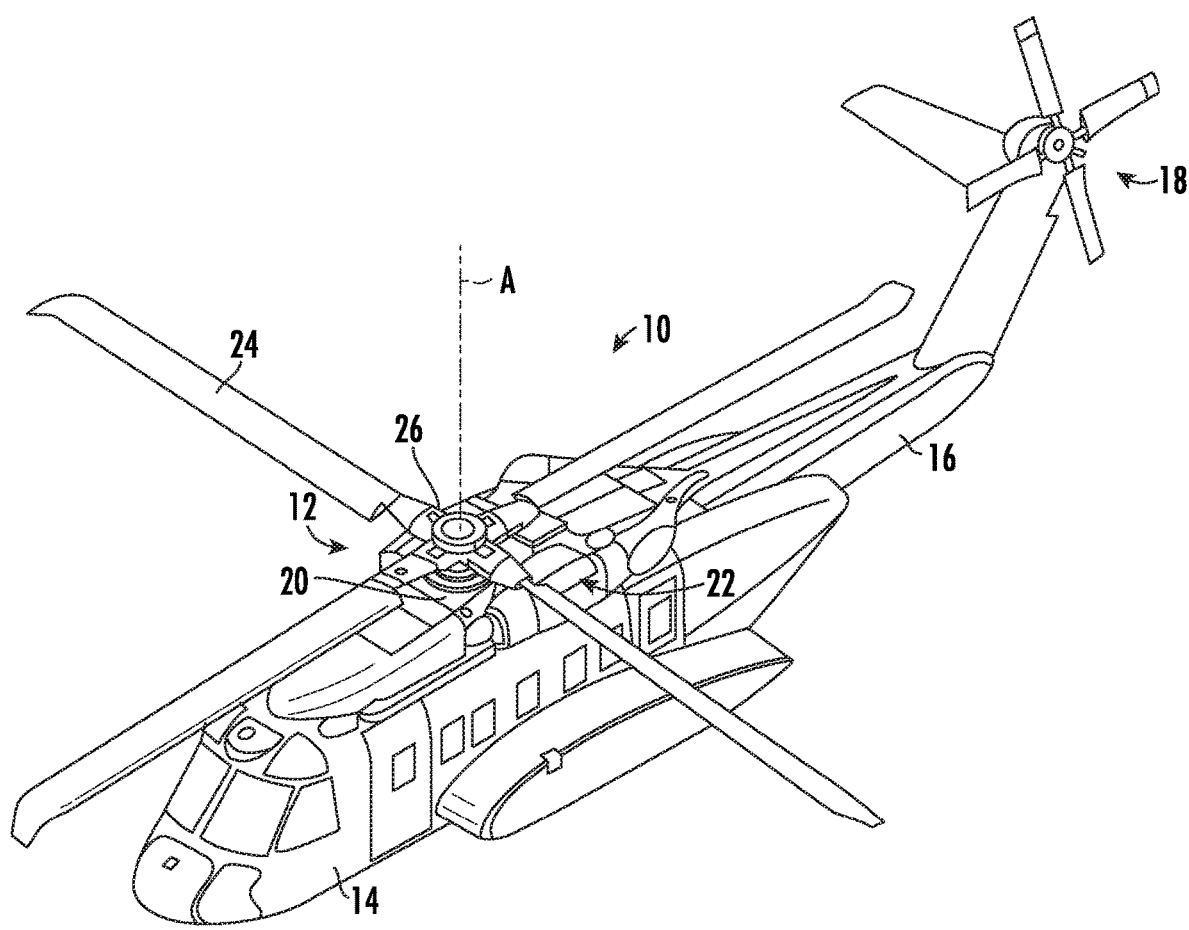
FIG. 1 depicts a rotary wing aircraft in accordance with an exemplary embodiment.

With reference now to FIG. 1, an example of a vertical takeoff and landing (VTOL) aircraft is schematically illustrated. The aircraft 10 in the disclosed, non-limiting embodiment includes a main rotor system 12 supported by an airframel 4 having an extending tail 16 which mounts an anti-torque system/tail rotor (TR) system 18. The main rotor assembly 12 is driven about an axis of rotation A through a main rotor gearbox (MGB) 20 by one or more engines 22. The engines 22 generate the power available for flight operations and couple such power to the main rotor assembly 12 and an anti-torque system 18 through the MGB 20. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines or any application with a critical bearing of the configuration described herein will also benefit here from.

Figure 2A:
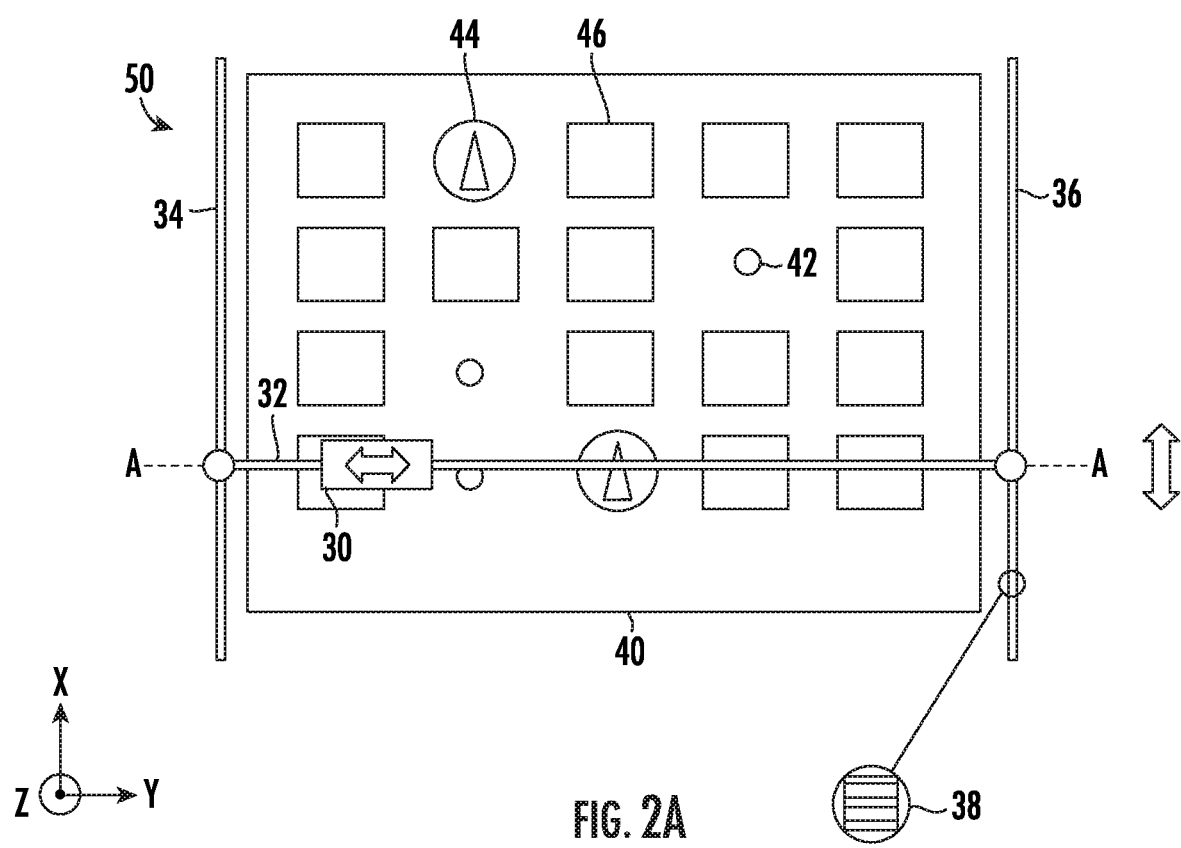
FIG. 2A depicts a plan view of a releasable actuation apparatus in accordance with an exemplary embodiment.
Figure 2B:
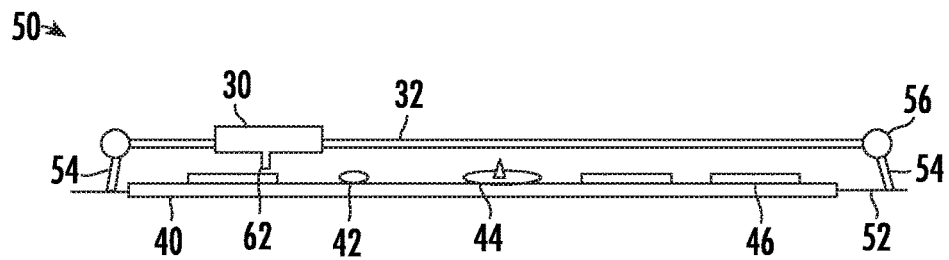
FIG. 2B depicts a cross-section of a releasable actuation apparatus in accordance with an exemplary embodiment.

Referring to FIG. 2A a plan view of the release apparatus 50 is shown, in which an actuator is moved above a switch panel according to one or more embodiments of the present invention. In accordance with FIG. 2A, a carriage 30 is movable along the Y direction along a first support member 32. In some embodiment, the first support member is a cross rod. The carriage 30 is movable along the X direction along a second support member 34. It should be appreciated that the second support member 34 can be either second support member 34 or second support member 36 depending on a desired orientation. In yet other embodiments, one end of the first support member 32 is coupled to second support member and the other end of the first support member 32 is releasably coupled to a third support member 36. In some embodiments, the second support member 34 is a guide rod. In some embodiments, a second support member 34 is substantially perpendicular to the first support member 32. The second support member 34 is also substantially planar with the first support member 32.

In some embodiments, the first support member 32 and the second support member 34 are provided with gear racks 38, respectively. A motor (not shown) is coupled to the first support member 32 and second support member 34, to drive the actuator carriage 30 in the X and Y directions. A motor coupled to the first support member 32 is secured to the carriage 30. The first support member 32 is coupled to at least one second support member 34, 36 via another motor. The second support member 34 further the supports the first support member 32 such that the first support member is in an elevated position above the switch panel 40. A positioning sensor (not shown) is attached to each motor. These position sensors operate to indicate the coordinate position of the carriage 30 in the X and Y directions with respect to a given reference point or origin.

The carriage 30, first support member 32, and the second support member 34 are components of a releasable apparatus 50 that is arranged in relation to a switch panel 40 of an aircraft or automobile. The switch panel 40 includes a variety of switches that allow pilots, drivers, technicians to control and maintain an aircraft or automobile. The switch panel 40 includes at least one of a toggle switch 42, rotary switch 44, and a push button/annunciator switch 46. The switch panel 40 can be situated on an interior or an exterior of the aircraft or automobile.

The carriage 30 is connected to an actuator 62 and at least one sensor (not shown). The actuator 62 is operable to move a position of each switch to an alternate position. The actuator is further affixed to a motor that drives the actuator 62 toward and retract away from the switch panel 40 in the Z direction. The sensor includes an image capturing device, LIDAR, radar, or other appropriate sensor operable to detect a position of a switch on the switch panel 40. In some embodiments, the actuator 62 includes a plurality of actuators operable to move different switches. In some embodiments, the actuator 62 comprises a solenoid actuator operable to move a plunger in a rotational direction to move a rotary switch 44. In some embodiments, the actuator 62 includes a tab that mechanically pushes a switch in an X direction of Y direction under the power of the motors. In some embodiments, the coordinate system used to navigate the carriage 30 is a cartesian coordinate system.

As seen in FIGS. 2A-4, the releasable apparatus 50 is configured to conform to a switch panel 40 and a surrounding frame 52. FIG. 2B depicts a cross-section AA of the releasable apparatus 50 from FIG. 2A. The releasable apparatus 50 is attached to the frame 52 by at least one releasable mount 54. The releasable mount 54 includes a pressure sensor operable to sense that the releasable mount 54 has been coupled to or released from the frame 52. In some embodiments, the releasable mount 54 includes a bracket affixed to the frame 52 and a slidable mount operable to slide horizontally into a cavity of the bracket. In other embodiments, the releasable mount 54 includes a releasable male clasp and a releasable female clasp, in which either the male clasp or female clasp is attached to the second support member 34 and the other clasp is inserted into the frame 52. The releasable mount 54 couples the first support member 32 to the frame 52. In some embodiments, the releasable mount 54 directly couples the first support member 32 to the frame. In other embodiments, the releasable mount 54 indirectly couples the first support member 32 to the frame 52. For example, the releasable mount 54 is connected to the second support member 34. The second support member 34 is connected to the first support member 32.

Figure 2C:
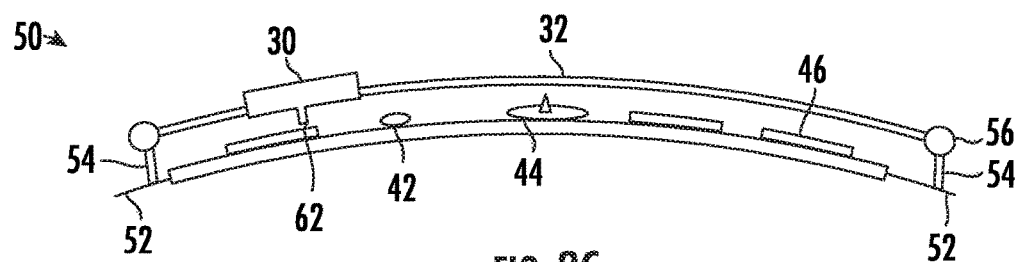
FIG. 2C depicts a cross-section of a releasable actuation apparatus in accordance with an exemplary embodiment.
Figure 2D:
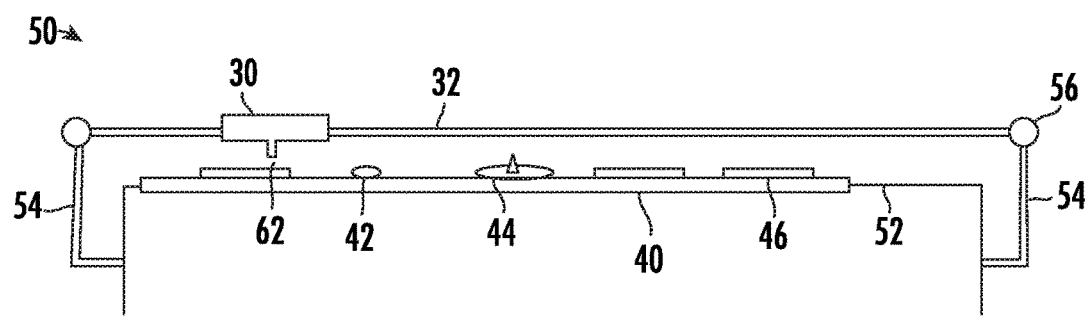
FIG. 2D depicts a cross-section of a releasable actuation apparatus in accordance with an exemplary embodiment.

FIG. 2C depicts a cross-section of a releasable apparatus 50 affixed to a curved frame 52 and curved switch panel 40. In this instance, the first support member 32 is curved at an arc angle substantially similar to the arc angle of the switch panel 40. FIG. 2D depicts a cross-section of a releasable apparatus 50, in which the surrounding frame 52 is not planar with the switch panel 40. In this instance, each releasable mount 54 is affixed to a side surface of the frame 52 in proximity to the switch panel 40.

Figure 2E:
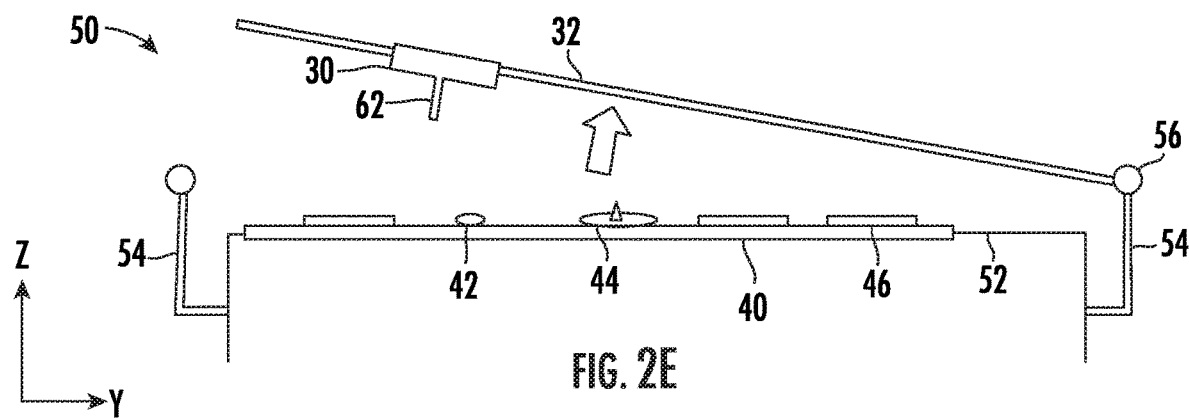
FIG. 2E depicts a cross-section of a releasable actuation apparatus in accordance with an exemplary embodiment.

Periodically, a pilot or driver may notice that the aircraft or vehicle is not operating properly and want to disengage the autonomous functionality of the releasable apparatus 50, but without removing the releasable apparatus 50 from the frame 54. Therefore, at least one releasable mount 54 is coupled to a first support member 32 through a rotatable joint 56, for example, a hinge. The first support member 32 being rotatable relative to the at least one releasable mount 54. The hinge 56 is operable to permit a pilot or driver access the switch panel 40 manually by pulling the first support member 32 to extend in a direction away from the switch panel 40. As seen in FIG. 2E, the first support member 32 is attached the hinge 56, which is attached to the releasable mount 54. The first support member 32 swivels around an axis relative to the hinge 56, thereby exposing the switch panel 40.

Figure 3:
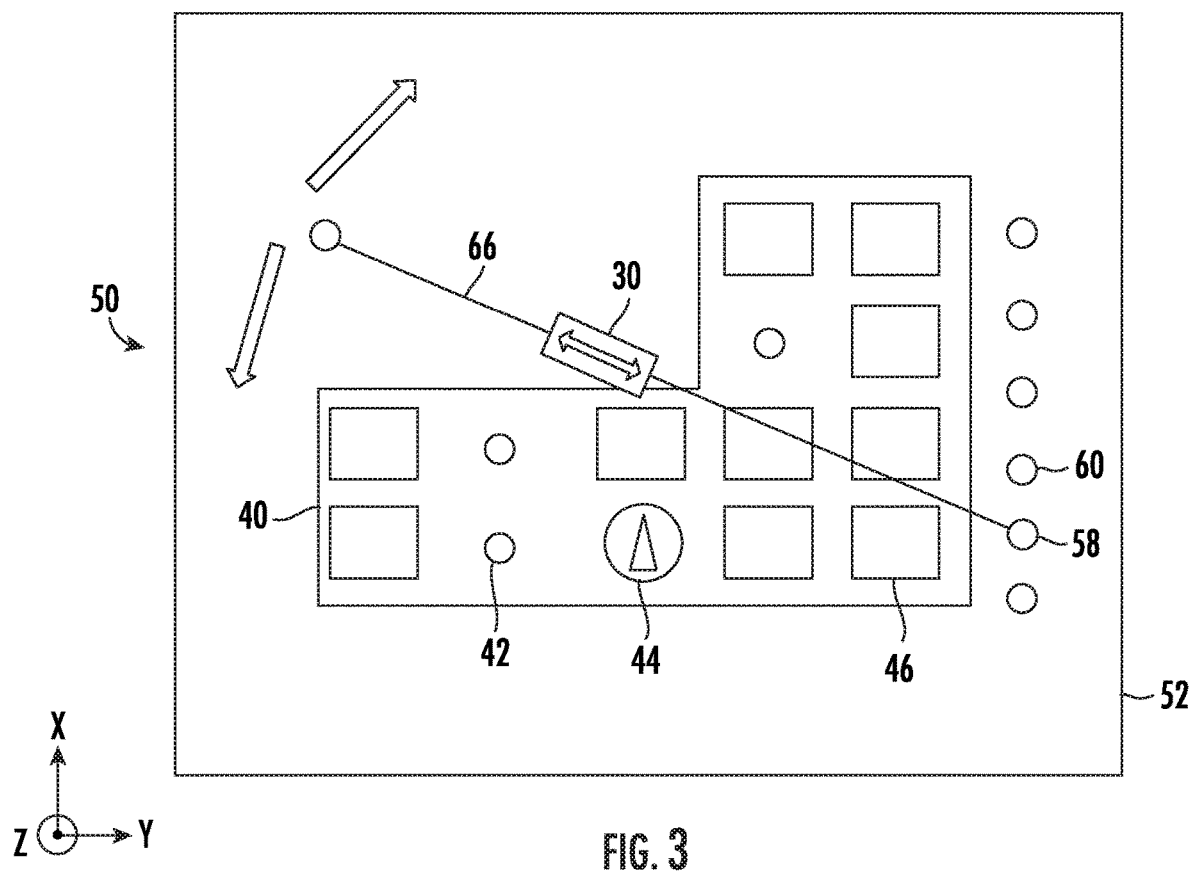
FIG. 3 depicts a plan view of a releasable actuation apparatus in accordance with an exemplary embodiment.

As depicted in FIG. 3, another embodiment of the releasable apparatus 50 is seen. The carriage 30 is affixed to an actuator (not shown) and movable along a fourth support member 66. The fourth support member 66 is attached to a rotatable releasable mount 58, which is affixed to the frame 52 via at least one of a plurality of orifices 60 that have been machined into the frame 52. The rotatable releasable mount 58 includes a rotatable joint (not shown) and an actuator operable to rotate the joint about an axis pointed in the Z direction. In addition, the rotatable releasable mount 58 includes a pivotable arm (not shown) for connecting to the fourth support member 66. By manually pulling the fourth support member 66, the pivotable arm unfolds to permit the fourth support member 66 to extend away from the switch panel 40. The pivotable arm is insertable into a cavity at an end of the first support member 32. In some embodiments, the fourth support member 66 is straight, and the coordinate system used to navigate the carriage 30 is a polar coordinate system. In some embodiments, the fourth support member 66 is curved and the carriage 30 is navigated using a spherical coordinate system.

Figure 4:
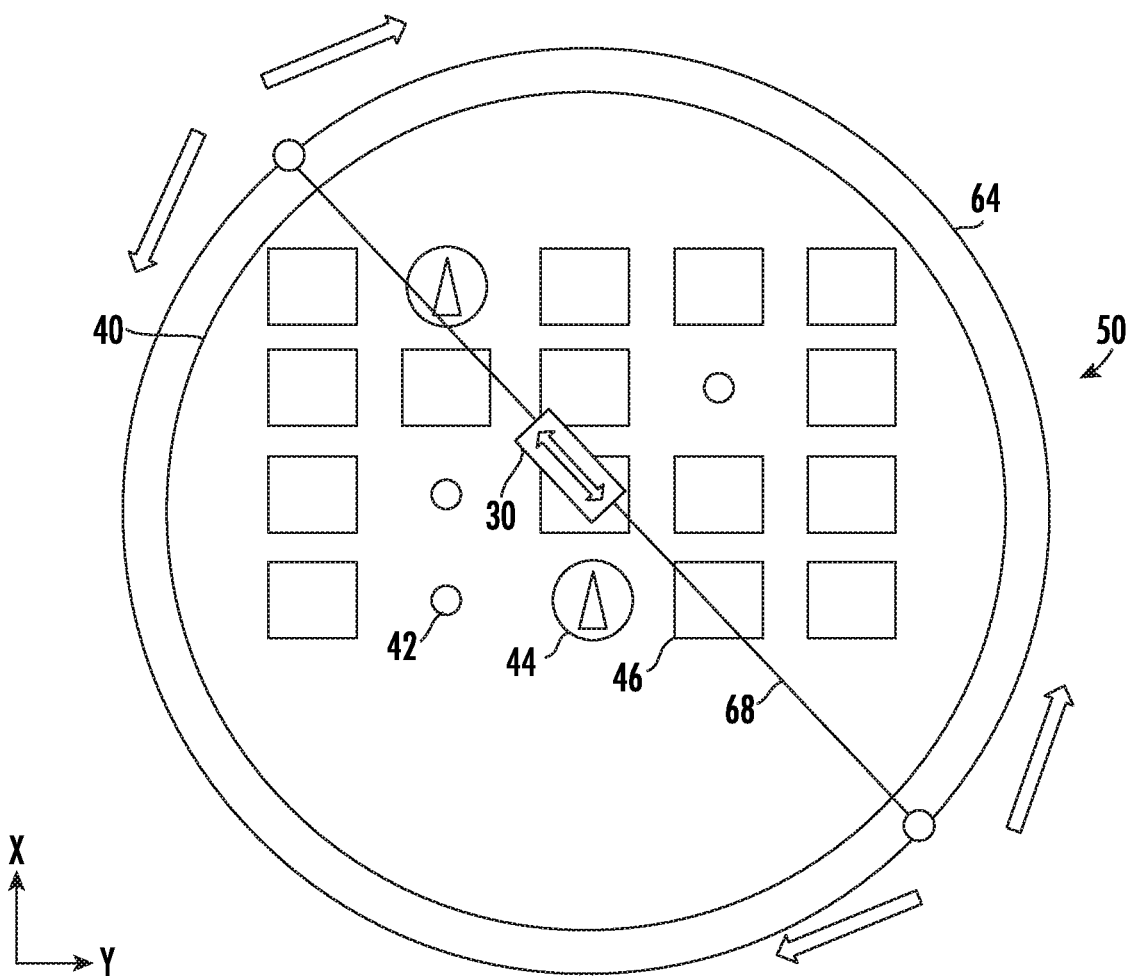
FIG. 4 depicts a plan view of a releasable actuation apparatus in accordance with an exemplary embodiment.

FIG. 4 depicts a plan view of a releasable apparatus 50, according to one or more embodiments of the present invention. The carriage 30 is affixed to an actuator and movable along a seventh support member 68. The sixth support member 64 is a single circular support member. The seventh support member 68 is attached to the sixth support member 64 by at least one actuator. The seventh support member 68 and the sixth support member 64 are provided with gear racks. A motor is connected to the sixth support member 64 and drives the seventh support member 68 360 degrees in either direction. In some embodiments, the seventh support member 68 is straight. In some embodiments, the seventh support member 68 is curved and the carriage 30 is navigated using a spherical coordinate system.

Figure 5:
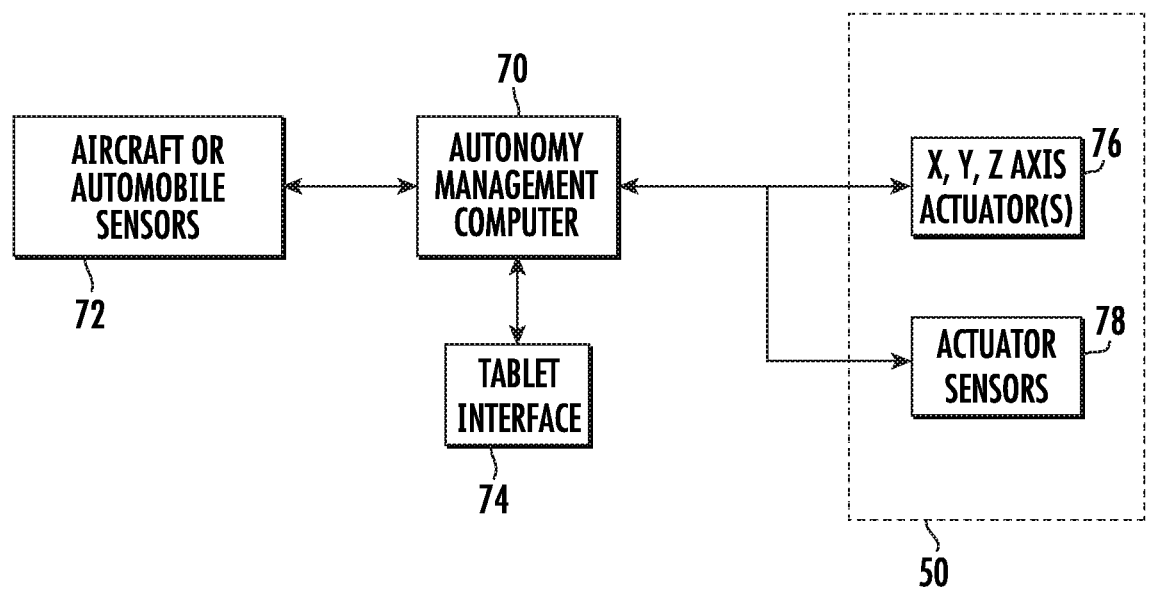
FIG. 5 depicts a block diagram of a releasable actuation system in accordance with an exemplary embodiment.

FIG. 5 depicts a block diagram of a system for automated switch activation. An autonomy management computer 70 is in operable communication with a plurality of sensors 72 arranged externally to the releasable apparatus at an interior and an exterior of an aircraft or automobile. The sensors 72 gather, detect, and transmit data necessary to maintain and operate an aircraft or automobile. For example, the sensors 70 gather data regarding fuel, speed, location, humidity, temperature, computer system functioning, etc. A user provides input and receives an output from the autonomy management computer through a tablet interface 70. The autonomy management computer 70 is also in operable communication with a plurality of actuators 76 and actuator sensors 78 that are connected to the releasable apparatus 50.

A switch panel of a legacy aircraft or automobile is retrofitted with an attachment point for a releasable mount. For example, the orifices 60 as depicted in FIG. 3 or the above-described bracket or clasp. The autonomy management computer 70 is equipped with machine learning circuitry. A deep neural network (DNN) or convolutional neural network (CNN) is trained using images of switch panels to classify switches and to recognize wear and tear on the switches. In addition to image recognition, the autonomy management computer 70 is trained to recognize an optimal state of each parameter of the aircraft or automobile based on at least one sensor reading.

In practice, the autonomy management computer 70 receives images from the actuator sensors 78 and is trained to classify each switch on a switch panel. The autonomy management computer 70 is also coupled with the computer system of the aircraft or automobile and detects the functionality of each switch. Using this information and the above-referenced positioning information, the autonomy management computer 70 maps each switch on the switch panel with a coordinate position of the carriage. In some embodiments, the autonomy management computer 70 engages direction of the actuator and motors in response to the releasable mount being coupled to the frame. Additionally, the autonomy management computer 70 disengages from directing the actuator and motors in response to the releasable mount being removed from the frame.

The autonomy management computer 70 receives data from the plurality of sensors 72. During this time, the vehicle or aircraft continues to display the sensor readings or sensor-based alerts to a driver or pilot. However, rather than the driver or pilot manually adjusting the switches, the autonomy management computer 70 transmits instructions to the motors and the carriage actuator to perform the switching. The image capturing sensors also transmit an image of a switch and/or an illuminated light (including illuminated nomenclature) indicating a state of a switch. Based on the sensor readings, the autonomy management computer 70 determines an optimal position of each switch and directs an actuator to place the switch in the optimal position. In addition to responsive actuation, the autonomy management computer 70 is trained to actuate pre-flight, mid-flight, and end-of-flight sequences of switch adjustments. The sequences are pre-loaded to the autonomy management computer 70 and performed based on detecting a take-off or landing. The autonomy management computer 70 is operable to communicate with the other components using wired or wireless technology. For example, the autonomy management computer 70 communicates using a technology such as Universal Serial Bus (USB), PS/2, Bluetooth, infrared, cellular, serial port, internet, parallel port, and/or other appropriate technology.

The releasable apparatus 50 is equipped with a back-up feature. In the event that the pilot or driver recognizes that the autonomy management computer 70 is not directing the switches to the optimal position or a computer failure has occurred, the pilot or driver can either pull the releasable apparatus 50 to a position extending away from the switch panel such that carrier actuator no longer reaches the switches. In the alternative, the driver or pilot detaches the releasable apparatus 50 from the frame. In either event, as the original switch panel remains, the pilot or driver can manually operate the switches. In some embodiments of the present invention, the carriage is equipped with one or more motion-detecting sensors (including an accelerometer). In the event that the autonomy management computer 70 detects the releasable apparatus 50 is moving in a direction away from the switch panel, the autonomy management computer 70 disengages from directing the actuator and motors until it detects the releasable apparatus 50 moving in the direction of the switch panel. In the event that the autonomy management computer 70 detects the releasable apparatus 50 is moving towards a direction of the switch panel, the autonomy management computer 70 engages direction of the actuator and motors. For example, the movement can be due to rotating the support member away from the switch panel via the hinge. The movement could also be due to inserting or removing the releasable apparatus 50 from the frame via the releasable mount.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A releasable actuation system, comprising:
   a support member;
   a carriage movable relative to the support member;
   a motor coupled to the carriage and the support member;
   a releasable mount configured to couple the support member to a frame, the support member being rotatable relative to the releasable mount by a rotatable joint;
   an image capturing sensor connected to the carriage;
   an actuator connected to the carriage and operable to adjust a position of a switch on a switch panel;
   a memory having computer readable instructions; and
   one or more processors for executing the computer readable instructions, the computer readable instructions controlling the one or more processors to perform operations comprising:
   directing the actuator to adjust the position of the switch; and
   disengaging from the actuator and the motor in response to detecting that the support member is rotating away from the switch panel.

2. The releasable actuation system of claim 1, wherein the computer readable instructions control the one or more processors to perform operations further comprising:
   receiving an image of the switch panel from the image capturing sensor;
   mapping a position of each switch of the switch panel to a coordinate system; and
   directing the actuator to adjust the position of the switch based in part on information received from an external sensor.

3. The releasable actuation system of claim 2, wherein the computer readable instructions control the one or more processors to perform operations further comprising:
   engaging the actuator and the motor in response to detecting that the support member is rotating towards the switch panel.

4. The releasable actuation system of claim 2, wherein the computer readable instructions control the one or more processors to perform operations further comprising:
   disengaging from the actuator and the motor in response to detecting that the releasable mount is removed from the frame.

5. The releasable actuation system of claim 2, wherein the computer readable instructions control the one or more processors to perform operations further comprising:
   engaging the actuator and the motor in response to detecting that the releasable mount is coupled to the frame.

6. The releasable actuation system of claim 2, wherein the computer readable instructions control the one or more processors to perform operations further comprising:
   performing a pre-loaded sequence of switch adjustments.

7. The releasable actuation system of claim 2, wherein the releasable mount includes a pressure sensor.

8. The releasable actuation system of claim 2, wherein the carriage includes a motion-detecting sensor.

9. The releasable actuation system of claim 2, wherein the support member has a straight orientation.

10. The releasable actuation system of claim 2, wherein the support member has a curved orientation.

11. The releasable actuation system of claim 2, wherein the external sensor is arranged on a frame of an aircraft or an automobile.

12. A computer-implemented method for releasable actuation, the method comprising:
    receiving, by a processor, an image of a switch panel and a functionality of each switch on the switch panel;
    mapping, by the processor, a position, functionality, and type of switch to a coordinate system of a releasable apparatus;

directing, by the processor, actuation of a switch on the switch panel using the coordinate system and based on information received from an external sensor;

disengaging, by the processor, from an actuator and a motor of the releasable apparatus in response to detecting that a support member of the releasable apparatus is rotating away from the switch panel.

13. The computer-implemented method of claim 12 further comprising:

performing a pre-loaded sequence of switch adjustments.

14. The computer-implemented method of claim 12 further comprising:

disengaging, by the processor, from the actuator and the motor of the releasable apparatus in response to detecting that a releasable mount of the releasable apparatus is removed from a frame.

15. The computer-implemented method of claim 12 further comprising:

engaging, by the processor, the actuator and the motor of the releasable apparatus in response to detecting that a releasable mount of the releasable apparatus is coupled to a frame.

16. The computer-implemented method of claim 12, further comprising:

engaging, by the processor, the actuator and the motor of the releasable apparatus in response to detecting that the support member of the releasable apparatus is rotating towards the switch panel.

17. The computer-implemented method of claim 12, wherein the switch panel is arranged on a frame of an aircraft or an automobile.

* * * * *